United States Patent [19]

Lichter

[11] Patent Number: 4,949,985
[45] Date of Patent: Aug. 21, 1990

[54] LOW RIDE SADDLE MOUNT

[75] Inventor: Nicholas J. Lichter, Kenosha, Wis.

[73] Assignee: Jupiter Transportation Company, Kenosha, Wis.

[21] Appl. No.: 369,950

[22] Filed: Jun. 22, 1989

[51] Int. Cl.$^5$ .............................................. B60P 3/075
[52] U.S. Cl. ..................................... 280/402; 414/563
[58] Field of Search ............................ 280/402, 414.5; 414/563

[56] References Cited

U.S. PATENT DOCUMENTS

| | | | |
|---|---|---|---|
| 2,152,279 | 3/1939 | Randall et al. | 280/402 |
| 2,411,411 | 11/1946 | Blair et al. | 280/402 |
| 2,647,760 | 8/1953 | Mettetal, Jr. | 280/402 |

Primary Examiner—Charles A. Marmor
Assistant Examiner—Mitchell Bompey
Attorney, Agent, or Firm—Barnes, Kisselle, Raisch, Choate, Whittemore & Hulbert

[57] ABSTRACT

A low ride saddle mount for use in the transportation of trucks comprising a pair of laterally spaced supports adapted to be mounted on a tow truck, and a shaft extending horizontally between and supported for axial rotation above the supports. A platform is secured to the shaft. A saddle is mounted on the platform for rotation about an axis extending at right angles to the longitudianl axis of the shaft. Clamps on the saddle are adapted to clamp onto the front axle of a truck to be towed. The saddle mount may be inverted so that the shaft is below the supports, to permit a lower ride.

3 Claims, 3 Drawing Sheets

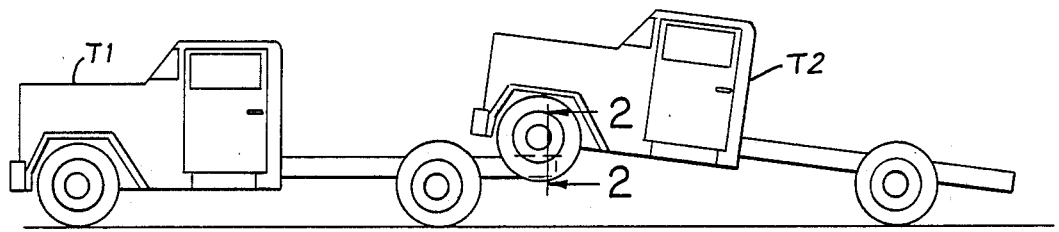
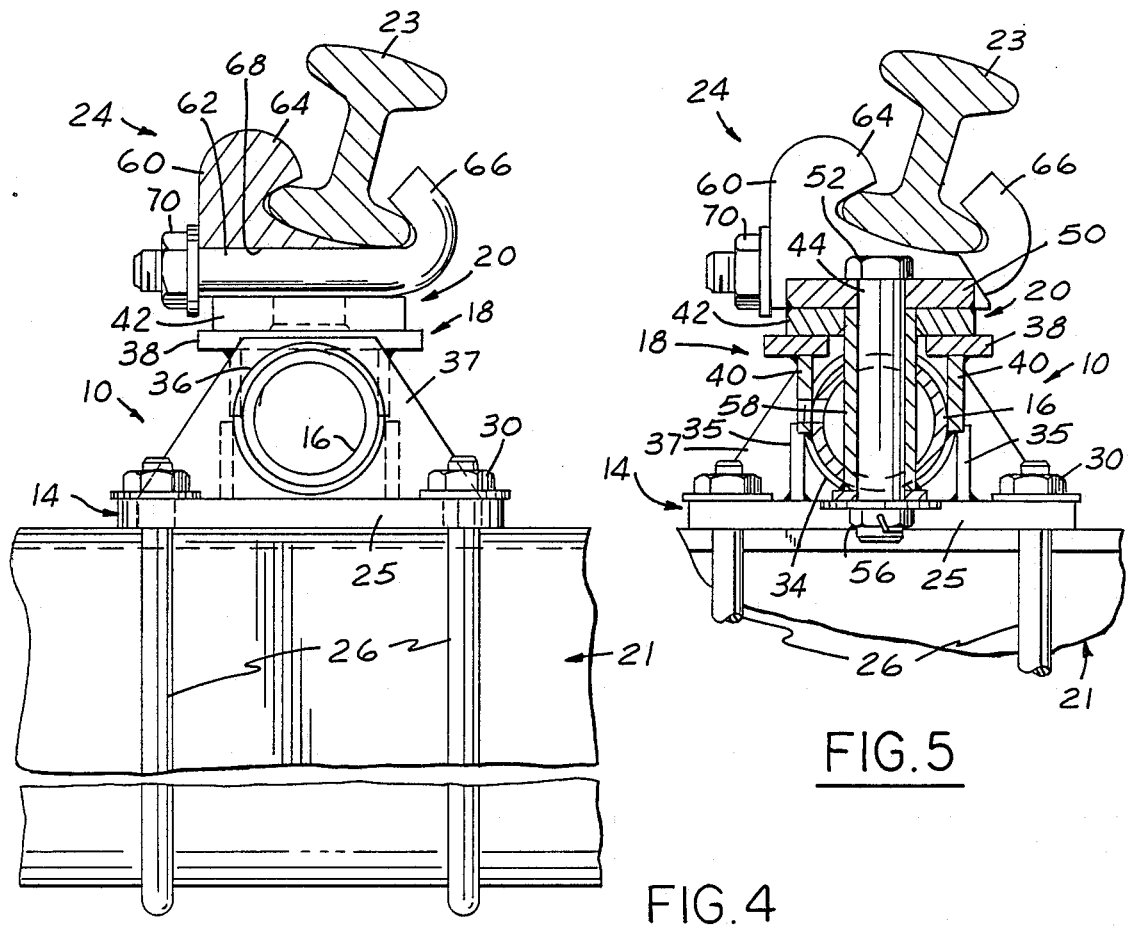
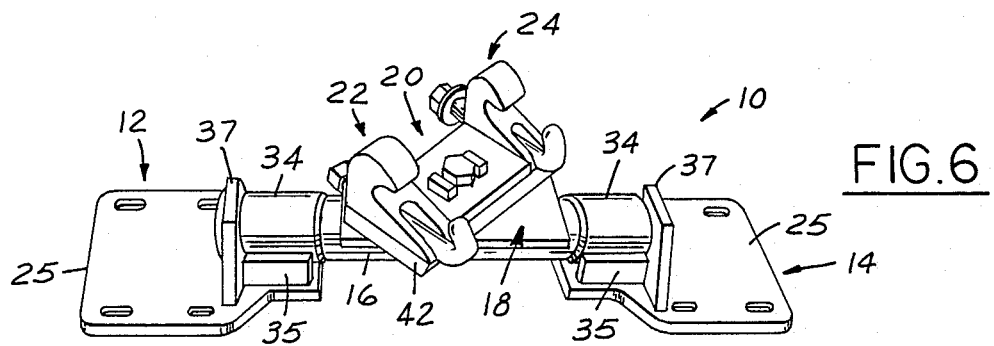

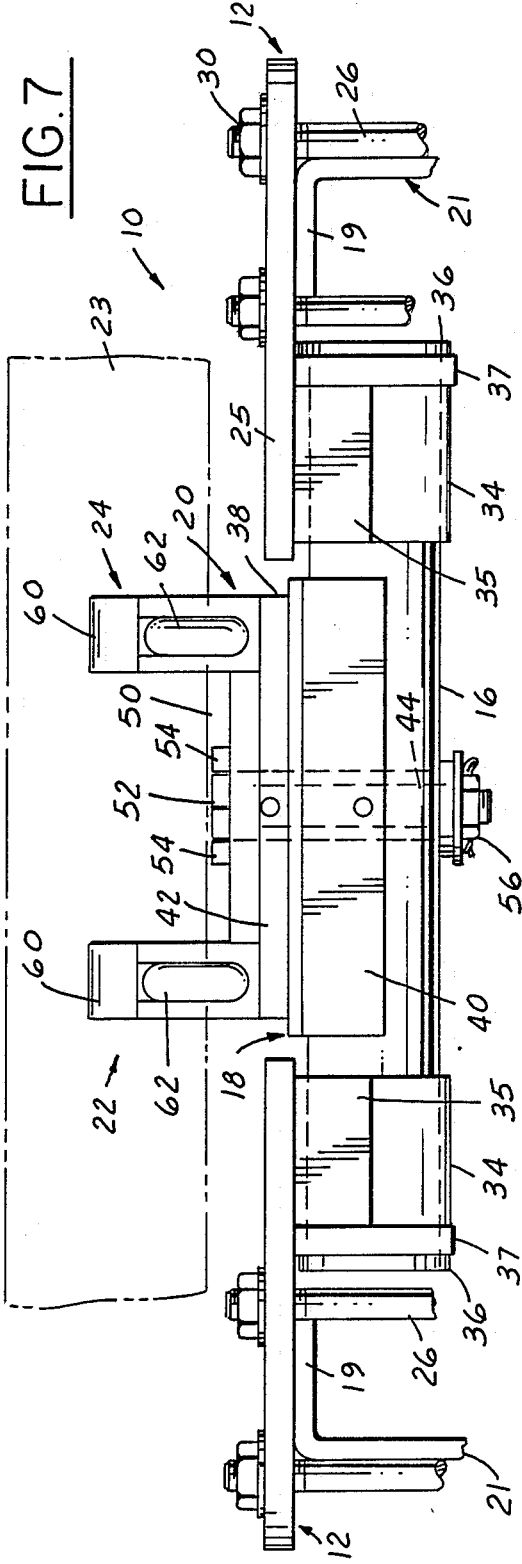

LOW RIDE SADDLE MOUNT

This invention relates generally to a low ride saddle mount for use in the transportation of trucks.

BACKGROUND AND SUMMARY OF THE INVENTION

The saddle mount of this invention allows the towed vehicle to be maintained at a low profile and yet is fully capable of accommodating the necessary range of relative movement between the towed vehicle and the towing vehicle.

Specifically, and as described in the specification to follow, the saddle mount has a pair of laterally spaced supports which are adapted to be mounted on the frame of the towing vehicle. A shaft extends between and is supported for rotation above these supports. A platform secured on the shaft mounts a saddle for rotation about an axis extending at right angles to the axis of the shaft. The saddle has attachment means adapted to be releasably secured to the front axle of a truck to be towed. The supports may be inverted so that the shaft is beneath the supports, permitting a lower ride.

More specifically, the platform and saddle have flat plates which overlie one another. The means for mounting the saddle for rotation comprises a pivot member which extends through the shaft and also through the platform and saddle plates.

The attachment means on the saddle comprises a pair of clamps on opposite sides of the axis of rotation of the saddle. Each clamp preferably comprises a fixed jaw and a movable jaw. The movable jaw is opposed to the fixed jaw and can be moved to an operative position relative to the fixed jaw in which the two jaws clamp the front axle of a truck to be towed.

It is an object of this invention to provide a low ride saddle mount having the above features which is relatively inexpensive to manufacture and yet highly successful in the accomplishment of its intended function; also one which is an improvement over saddle mounts which have been made in the past, including those disclosed in the following U.S. patents:

| | |
|---|---|
| 1,334,113 | Norton |
| 1,845,611 | Loveridge |
| 2,152,279 | Randall, et al |
| 2,411,411 | Blair, et al |
| 2,416,921 | Hingley |
| 2,436,485 | Roxy |
| 2,436,499 | Williams |
| 2,451,119 | Regan |
| 2,541,209 | Cox |
| 2,647,760 | Mettetal, Jr. |

These and other objects of the invention will become more apparent as the following description proceeds, especially when considered with the accompanying drawings.

BRIEF DESCRIPTION OF THE DRAWINGS

FIG. 1 is a side elevational view showing one truck being towed by another, by means of the low ride saddle mount of this invention.

FIG. 4 is a view partly in section and partly in elevation taken on the line 4—4 in FIG. 2.

FIG. 5 is a sectional view taken on the line 5—5 in FIG. 2.

FIG. 6 is a perspective view of the saddle mount of this invention.

FIG. 7 is a view similar to FIG. 2, but showing the saddle mount inverted for a lower ride.

DETAILED DESCRIPTION

Figure 2:
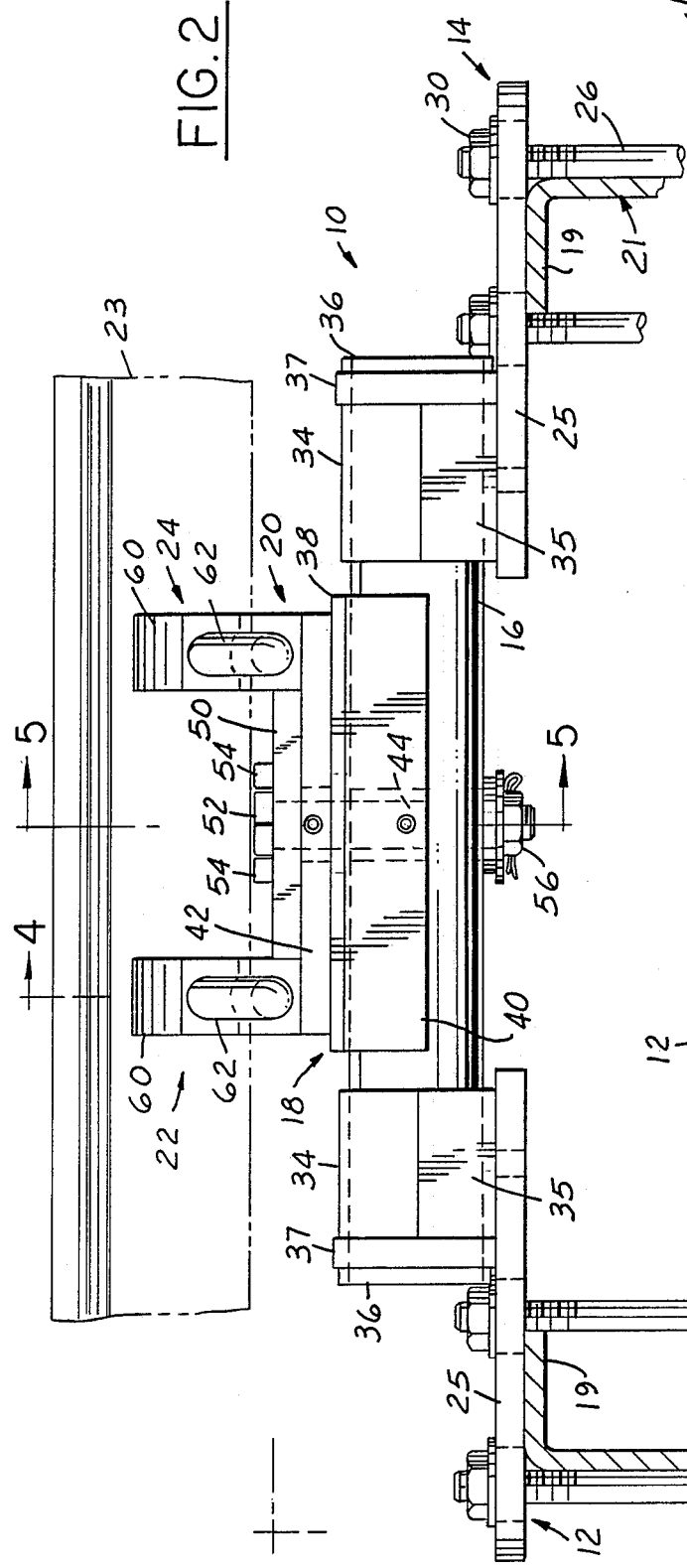
FIG. 2 is a sectional view taken on the line 2—2 in FIG. 1.
Figure 3:
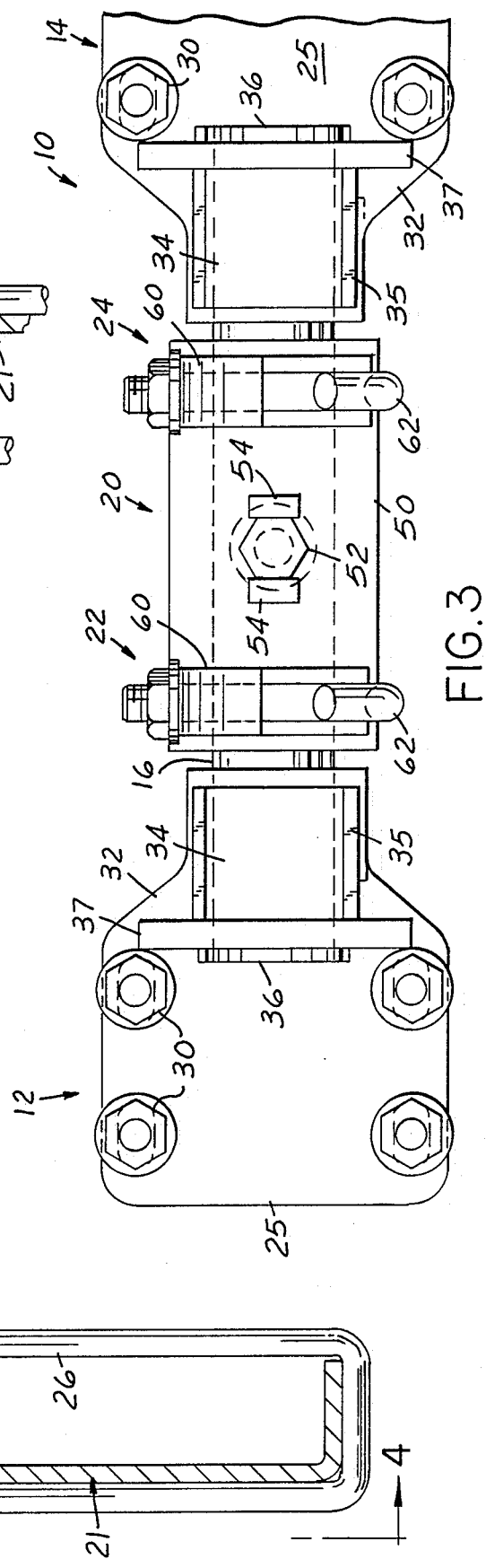
FIG. 3 is a top plan view of the saddle mount shown in FIG. 2.

Referring now more particularly to the drawings, the saddle mount is generally indicated by the reference numeral 10 and comprises a pair of supports 12 and 14, an elongated tubular cylindrical horizontal shaft 16 extending between and rotatably supported by the supports, a platform 18 rigidly mounted on the shaft 16 between supports 12 and 14, a saddle 20 pivotally mounted on the platform 18, and clamps 22 and 24 on the saddle. The saddle mount 10 is adapted to be mounted on the top horizontal flanges 19 of the laterally spaced, longitudinally extending channels 21 of a towing truck T1 and to be attached to the front axle 23 of a towed truck T2.

The two supports 12 and 14 are identical. Each has a flat plate 25 with four holes adapted to receive U-bolts 26 which extend around the longitudinal frame members of the towing vehicle T1. The ends of the U-bolts extend through the holes in the support plate 25 and are secured to the support plate by nuts 30. Each plate 25 has a narrow extension along its inner edge indicated at 32 and on the top surface of this extension is rigidly mounted a cylindrical sleeve 34. The sleeves 34 are aligned with one another. Flanges 35 on opposite sides of the sleeves 34 are welded both to the sleeves and to the support plates 25. An upright flange 37 is welded to the top surface of each support plate 25 and to sleeve 34 and is apertured to allow the shaft 16 to extend through it.

The shaft 16 extends horizontally between the supports 12 and 14, and its ends are journalled for rotation in the sleeves 34. Retainer rings 36 on the extreme ends of the horizontal shaft 16 abut the outer ends of the sleeves 34 to retain the shaft in assembly therewith. These rings 36 may be secured to the shaft ends by any suitable means as by welding.

The platform 18 has a flat rectangular plate 38 resting on the shaft 16 between the supports 12 and 14. Flanges 40 are welded to the platform plate 38 and extend downwardly at right angles thereto along opposite sides of the shaft. These flanges are rigidly secured to the shaft 16 as by welding. The undersurface of the platform plate may also be welded to the shaft to provide a rigid construction.

The saddle 20 has a flat rectangular plate 42 parallel to and in overlying contact with the platform plate 38. The saddle 20 is mounted on the platform 18 for rotation about an axis at right angles to the longitudinal axis of the shaft 16 by means of a pivot member or bolt 44. The two parallel clamps 22 and 24 on the top surface of saddle plate 42 are on opposite sides of the bolt 44. A plate 50 is secured to the top surface of saddle plate 42 between the clamps. The bolt 44 extends through the shaft 16 and through the platform plate 38 and saddle plates 42 and 50. The bolt has a polygonal head 52 at the upper end and is prevented from rotating by two abutments 54 secured to the top of the plate 50 in positions to engage flats on opposite sides of the bolt head. A nut 56 threaded on the opposite end of the bolt secures the connection. A tubular liner 58 extends through the shaft 16 and the platform and saddle plates 38 and 42 and surrounds the shank of the bolt so that the bolt can rotate freely.

The clamps 22 and 24 have parallel fixed jaws 60 and parallel movable jaws 62. Each fixed jaw is rigidly secured to saddle plate 42 and has a generally C-shaped clamping portion 64. The movable jaw is in the form of an elongated stud which is return bent on one end to provide a C-shaped clamping portion 66 opposed to the clamping portion 64 of the fixed jaw. The movable jaws are mounted for sliding movement within passages 68 in the fixed jaws. The passages 68 are parallel and extend at right angles to the longitudinal axis of the shaft 16 and also at right angles to the bolt 44. The movable jaw 62 of each clamp can thus be moved to place its C-shaped clamping portion 66 in different positions with respect to the clamping portion of the fixed jaw. A nut 70 is threaded on the end of each movable jaw opposite to its C-shaped clamping portion.

In use, the saddle mount 10 is mounted on the top horizontal flanges 19 of channels 21 of the towing truck T1 in a position such that shaft 16 is horizontal and at right angles to the channels 21 and to the longitudinal center line of truck T1. This is accomplished by the U-bolts 26 and nuts 30. The clamps 22 and 24 are opened by moving the movable jaws 62 away from the fixed jaws 60 to enable the front axle 23 of a truck T2 to be placed between the clamp jaws. Then, the movable jaws are moved toward the fixed jaws to clamp the opposite sides of the lower flange of the front axle 23. The nuts 70 are tightened to retain the movable jaws in the clamping position. The saddle can rotate about the axis of the bolt 44 and shaft 16 on which the saddle is mounted can rotate about its own longitudinal axis, providing the necessary range of relative movement between the two trucks T1 and T2.

The saddle mount 10 can be mounted on the channels 21 of the towing truck T1 in the upright position shown in FIG. 2 with the bottoms of the support plates 25 resting on channel flanges 19 and shaft 16 above the support plates. Alternatively, the saddle mount 10 can be inverted as in FIG. 7 with the tops of the support plates 25 engaging channel flanges 19 and shaft 16 below the support plates. In the FIG. 7 position of the saddle mount, the front axle 23 of the towed truck T2 is supported at an even lower level.

I claim:

1. A low rid saddle mount for use in the transportation of trucks, comprising a pair of laterally spaced supports, a generally horizontal shaft extending between said supports, aligned journals on said supports supporting the ends of said shaft for axial rotation, a platform on said shaft between said ends thereof, a saddle, means mounting said saddle on said platform for rotation about a transverse axis extending at right angles to the longitudinal axis of said generally horizontal shaft, and attachment means on said saddle adapted to releasably clamp on the front axle of a truck to be towed, said supports being adapted to be mounted on a towing truck in an upright position in which said shaft is above said supports, said supports also being adapted to be mounted on a towing truck in inverted position in which said shaft is below said supports for a lower ride, the construction and arrangement being such that said saddle and attachment means can rotate about said transverse axis free of interference with said supports and journals in the upright position of said supports and also in the inverted position thereof, said attachment means being disposed above said supports and journals in both said positions of said supports so that said saddle and attachment means with the front axle of a truck to be towed clamped to said attachment means can rotate about said transverse axis without interference in both said positions of said supports.

2. A low ride saddle mount for use in the transportation of trucks, comprising a pair of laterally spaced supports, a generally horizontal shaft extending between said supports, aligned journals on said supports supporting the ends of said shaft for axial rotation, a platform having a flat plate rigidly mounted on said shaft between said ends thereof, a saddle having a flat plate overlying said platform plate in parallel relation therewith, means mounting said saddle on said platform for rotation about a transverse axis extending at right angles to the longitudinal axis of said generally horizontal shaft comprising a pivot member extending transversely through said generally horizontal shaft and through said platform and saddle plates, and attachment means on said saddle adapted to releasably clamp on the front axle of a truck to be towed comprising a pair of clamps carried by said saddle plate on opposite sides of the axis of rotation of said saddle, said supports being adapted to be mounted on a towing truck in an upright position in which said shaft is above said supports, said supports also being adapted to be mounted on a towing truck in inverted position in which said shaft is below said supports for a lower rid, the construction and arrangement being such that said saddle and attachment means can rotate about said transverse axis free of interference with said supports and journals in the upright position of said supports and also in the inverted position thereof, said attachment means being disposed above said supports and journals in both said positions of said supports so that said saddle and attachment means with the front axle of a truck to be towed clamped to said attachment means can rotate about said transverse axis without interference in both said positions of said supports.

3. A low ride saddle mount as defined in claim 2, wherein each clamp comprises a fixed jaw, a movable jaw opposed to said fixed jaw and a movable to an operative position relative to said fixed jaw in which said jaws are adapted to clamp onto the lower flange of the front axle of a truck to be towed, and releasable means for retaining said movable jaw in said operative position.

* * * * *